United States Patent [19]
Yamamoto

[11] Patent Number: 5,907,362
[45] Date of Patent: May 25, 1999

[54] PICTURE CODING APPARATUS

[75] Inventor: Naoto Yamamoto, Tokyo, Japan

[73] Assignee: NEC Corporation, Tokyo, Japan

[21] Appl. No.: 08/784,515

[22] Filed: Jan. 17, 1997

[30] Foreign Application Priority Data

Jan. 19, 1996 [JP] Japan ................................ 8-025765

[51] Int. Cl.$^6$ ................................. H04N 7/12
[52] U.S. Cl. .................... 348/405; 348/408; 348/419
[58] Field of Search .................... 348/403, 405, 348/407, 408, 12, 419, 402, 608, 420, 397, 472, 390, 384; H04N 7/12

[56] References Cited

U.S. PATENT DOCUMENTS

| | | | |
|---|---|---|---|
| 5,325,125 | 6/1994 | Naimpally et al. | 348/408 |
| 5,329,375 | 7/1994 | Juri et al. | 348/408 |
| 5,337,087 | 8/1994 | Mishima | 348/408 |
| 5,355,167 | 10/1994 | Juri | 348/405 |
| 5,489,944 | 2/1996 | Jo | 348/405 |
| 5,598,213 | 1/1997 | Chung et al. | 348/419 |
| 5,636,316 | 6/1997 | Oku et al. | 348/403 |
| 5,664,028 | 9/1997 | Blonstein et al. | 348/403 |

OTHER PUBLICATIONS

M. Enari et al., "HDTV codec' for 60–140 Mbps", Video Information, (Jan. 1992), pp. 51–58.

Primary Examiner—Bryan Tung
Assistant Examiner—Gims S. Philippe
Attorney, Agent, or Firm—Foley & Lardner

[57] ABSTRACT

Picture data into small-area blocks, which are then shuffled. The shuffled picture data is then subjected to orthogonal transform. A total-frequency-range activity of transform coefficients is calculated on a block-by-block basis and accumulated over a slice. A high-frequency-range activity of the transform coefficients is calculated on a block-and-block basis and accumulated over the slice. Selection is made between a block quantization step which is calculated from the total-frequency-range activity of a block and a slice quantization step which is calculated adaptively from the total-frequency-range activity accumulation value of the slice. A quantization step to be used in actual quantization is determined by using the sum of the selected quantization step and a difference quantization step.

4 Claims, 11 Drawing Sheets

FIG.1

ORDINARY
BLOCK CONVERSION

FIG.2A

SHUFFLING
CONVERSION

| BLOCK NO. | 1st SLICE | | | | | | | | | | 2nd SLICE | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 | 7 | 8 | 9 | 10 |
| BLA | 300 | 190 | 320 | 270 | 200 | 330 | 240 | 250 | 170 | 230 | 300 | 150 | 320 | 270 | 400 | 330 | 280 | 250 | 170 | 230 |
| BLH | 150 | 40 | 100 | 80 | 70 | 60 | 110 | 50 | 20 | 90 | 150 | 40 | 100 | 80 | 70 | 60 | 110 | 50 | 20 | 90 |
| MBQ | 15 | 9 | 16 | 13 | 10 | 16 | 12 | 12 | 8 | 11 | 15 | 7 | 16 | 13 | 20 | 16 | 14 | 12 | 8 | 11 |
| SLQ | 25 | 25 | 25 | 25 | 25 | 25 | 25 | 25 | 25 | 25 | 27 | 27 | 27 | 27 | 27 | 27 | 27 | 27 | 27 | 27 |
| BLA>THB | 1 | 0 | 1 | 1 | 1 | 1 | 1 | 1 | 0 | 1 | 1 | 0 | 1 | 1 | 1 | 1 | 1 | 1 | 0 | 1 |
| BLH/BLA >TBR | 1 | 0 | 1 | 1 | 1 | 0 | 1 | 0 | 0 | 1 | 1 | 0 | 1 | 1 | 0 | 0 | 1 | 0 | 0 | 1 |
| SEQ | 25 | 9 | 25 | 25 | 25 | 16 | 25 | 12 | 8 | 25 | 27 | 7 | 27 | 27 | 20 | 16 | 27 | 12 | 8 | 27 |
| dQ | 0 | 0 | 0 | 1 | 1 | 2 | 2 | 2 | 1 | 0 | 0 | 1 | 2 | 1 | 1 | 0 | 0 | 0 | -1 | -1 |
| AQ | 0 | 0 | 0 | 0 | 0 | 0 | 0 | 0 | 0 | 0 | 1 | 1 | 1 | 1 | 1 | 1 | 1 | 1 | 1 | 1 |
| QSC | 25 | 9 | 25 | 26 | 16 | 18 | 27 | 14 | 9 | 25 | 28 | 9 | 30 | 29 | 22 | 17 | 28 | 13 | 8 | 27 |

PICTURE CODING APPARATUS

BACKGROUND OF THE INVENTION

1. Field of the Invention

The present invention relates to a picture coding apparatus and, more specifically, to a picture coding apparatus which compresses moving pictures or still pictures to less than a predetermined code amount.

2. Description of the Prior Art

Figure 11:
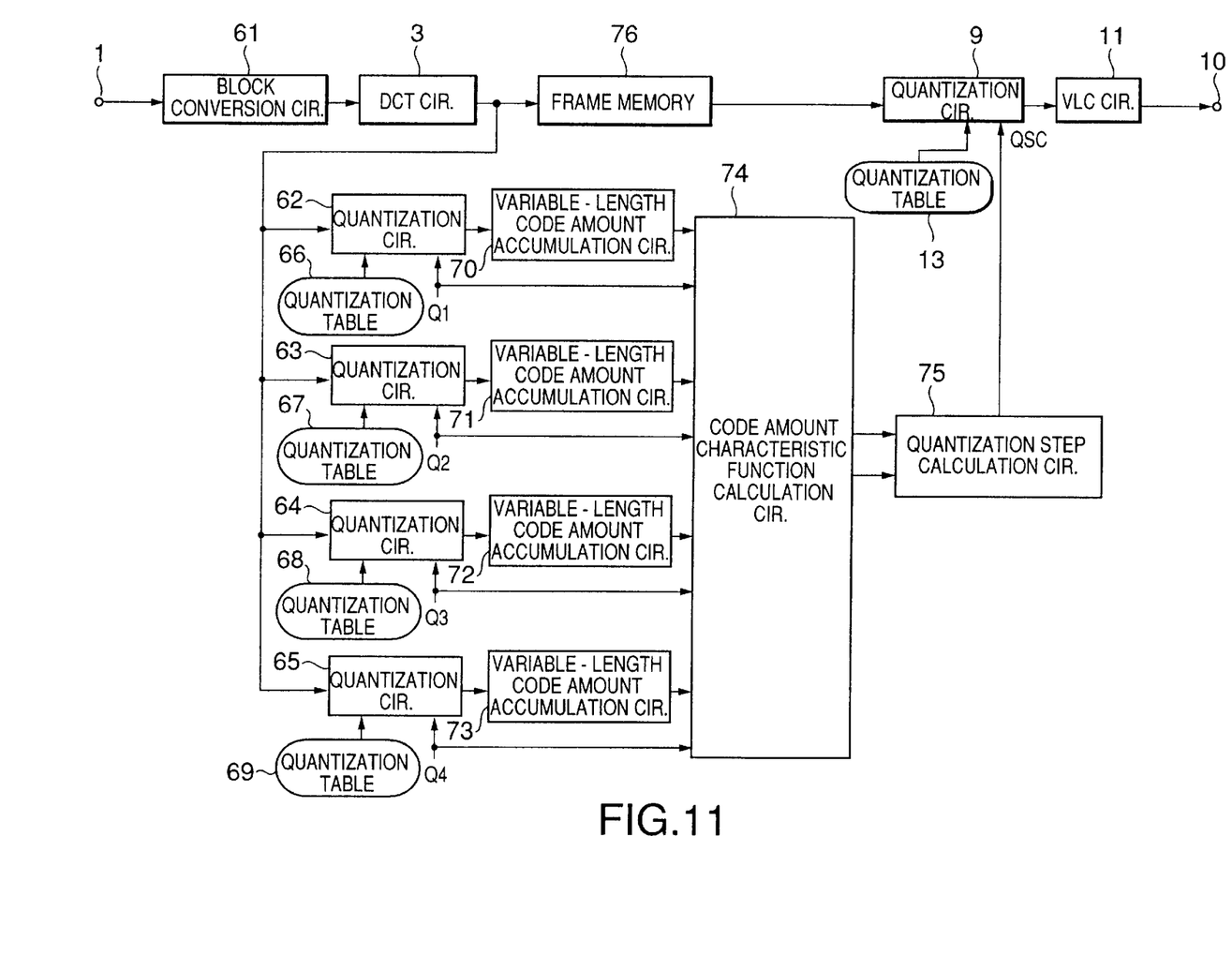
FIG. 11 is a block diagram showing the configuration of a conventional picture coding apparatus.

FIG. 11 shows the configuration of a conventional picture coding apparatus. In this apparatus, a frame picture is divided into non-overlapping blocks of (8 pixels)×(8 lines) and variable-length coding is performed by orthogonal-transforming each block while a control is so made that the one-frame code amount falls within a target code amount. As for the orthogonal transform, the two-dimensional discrete cosine transform (DCT) is generally used.

Referring to FIG. 11, a digital video input signal is input to a block conversion circuit 61 via an input terminal 1. The block conversion circuit 61 writes the signal into an internal memory (not shown) in the field order, and outputs a one-frame signal to a DCT circuit 3 on an 8-pixel/8-line block basis by properly controlling the memory once the one-frame signal is stored in the memory.

The DCT circuit 3 DCT-transforms the signal of an 8-pixel/8-line block basis that is supplied from the block transform circuit 61, and outputs resulting DCT coefficients to a frame memory 76 and four quantization circuits 62–65.

The four quantization circuits quantize the DCT coefficients by using respective quantization tables 66–69 and different quantization steps, and output quantized coefficients to respective variable-length code amount accumulation circuits 70–73.

Each of the variable-length code amount accumulation circuits 70–73 accumulates the corresponding set of quantized coefficients, i.e., the code amount of the variable-length coding over one frame, and outputs an accumulated code amount to a quantization characteristic function calculation circuit 74.

The quantization characteristic function calculation circuit 74 calculates a code amount characteristic function indicating the characteristic of an input picture based on two sets of an accumulated code amount and a quantization step in which the two accumulated code amounts are closest to the target code amount, and outputs the calculated function to a quantization step calculation circuit 75.

The quantization step calculating circuit 75 predicts, by using the code amount characteristic function, a quantization step which would make the code amount smaller than the target code amount, and outputs the predicted quantization step to a quantization circuit 9 which is used for actual quantization.

The quantization circuit 9 quantizes DCT coefficients as delayed by a frame memory 76 by using a quantization table 13 and the received quantization step, and outputs quantized coefficients to a variable-length coding circuit (VLC circuit) 11.

The VLC circuit 11 performs variable-length coding such as run-length coding and/or Huffman coding, and outputs coded data.

An example of the above picture coding scheme is described in detail in M. Enari and M. Kashida, "'HDTV codec' for 60–140 Mbps," Video Information, January 1992, pp. 51–58.

In the above-described conventional picture coding apparatus, control is so made as to code a one-frame picture to produce a code amount that is smaller than the target code amount by analyzing one-frame data by means of a plurality of quantizers and code amount accumulation circuits.

However, because 4 to 8 quantizers and variable-length code amount accumulation circuits need to be operated in parallel to obtain reproduction of high quality picture, the above conventional scheme is disadvantageous in that not only the circuit scale is increased but also an input picture needs to be delayed for a data analyzing period during which the quantization, the code amount accumulation, and the quantization step prediction are performed. Thus, the conventional scheme has a problem that it is very difficult to reduce the power consumption, size, and weight.

BRIEF SUMMARY OF THE INVENTION

An object of the present invention is to provide, by solving the above problems in the art, a picture coding apparatus which can code a one-frame picture to produce a code amount that is smaller than a target code amount even by performing the data analysis for code amount control with a simple means of determining an activity accumulation value for a plurality of blocks, which can provide reproduction picture quality that is equivalent to that obtained by the conventional means of performing frame-by-frame quantization and variable-length code amount accumulation, and which can be reduced in size.

According to a first embodiment of the invention, there is provided a picture coding apparatus comprising shuffling means for dividing an input digital picture signal into small-area blocks consisting of a predetermined number of pixels, and for shuffling the blocks within a frame; orthogonal transform means for orthogonal-transforming the shuffled, block-basis digital picture signal, to produce transform coefficients; quantizing means for quantizing the transform coefficients by using a quantization table and a quantization step; variable-length coding means for converting the quantized coefficients into variable-length code words by using run-length codes and Huffman codes; with code amount control means for determining the quantization step to be used in the quantizing means by using a sum of a slice quantization step which is calculated from an accumulation value of an activity of a slice consisting of a plurality of orthogonal transform blocks and a difference quantization step which is calculated from a difference between a prediction code amount and an output code amount (number of bits) per block of the variable-length coding means.

According to a second embodiment of the invention, in the picture coding apparatus of the first embodiment, the code amount control means comprises a counter for counting the number of blocks with which the output code amount of the variable-length coding means is larger than the prediction code amount, and the quantization step to be used in the quantizing means is determined by using a sum of the slice quantization step, the difference quantization step, and an offset quantization step which is determined based on the counted number of blocks.

According to a third embodiment of the invention, there is provided a picture coding apparatus comprising shuffling means for dividing an input digital picture signal into small-area blocks consisting of a plurality of pixels, and for shuffling the blocks within a frame; orthogonal transform means for orthogonal-transforming the shuffled, block-basis digital picture signal, to produce transform coefficients; quantizing means for quantizing the transform coefficients by using a quantization table and a quantization step; variable-length coding means for converting the quantized coefficients into variable-length code words by using run-length codes and Huffman codes; and code amount control means for calculating a total-frequency-range activity and a high-frequency-range activity of each orthogonal transform block and a total-frequency-range activity accumulation value and a high-frequency-range activity accumulation value of a slice consisting of a plurality of blocks, selecting either of a slice quantization step which is calculated from the total-frequency-range activity accumulation value of the slice and a block quantization step which is calculated from the total-frequency-range activity of the block by using, as parameters for judgment, the total-frequency-range activity of the block and/or the high-frequency-range activity of the block, the total-frequency-range activity accumulation value of the slice and/or the high-frequency-range activity accumulation value of the slice, and a ratio between the total-frequency-range activity accumulation value of the slice and the high-frequency-range activity accumulation value of the slice, and determining the quantization step to be used in the quantizing means based on the selected quantization step.

According to a fourth aspect of the invention, in the picture coding apparatus of the third embodiment, the code amount control means determines the quantization step to be used in the quantizing means by using a sum of the selected quantization step, and a difference quantization step which is calculated from a difference between a prediction code amount and an output code amount per block of the variable-length coding means.

According to a fifth embodiment of the invention, in the picture coding apparatus of the fourth embodiment, the code amount control means comprises a counter for counting the number of blocks with which the output code amount of the variable-length coding means is larger than the prediction code amount, and the quantization step to be used in the quantizing means is determined by using a sum of the selected quantization step, the difference quantization step, and an offset quantization step which is determined based on the counted number of blocks.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

Picture coding apparatuses according to embodiments of the present invention will be hereinafter described in detail with reference to the accompanying drawings. The same components in FIGS. 1–8 are given the same reference numerals.

Embodiment 1

Figure 1:
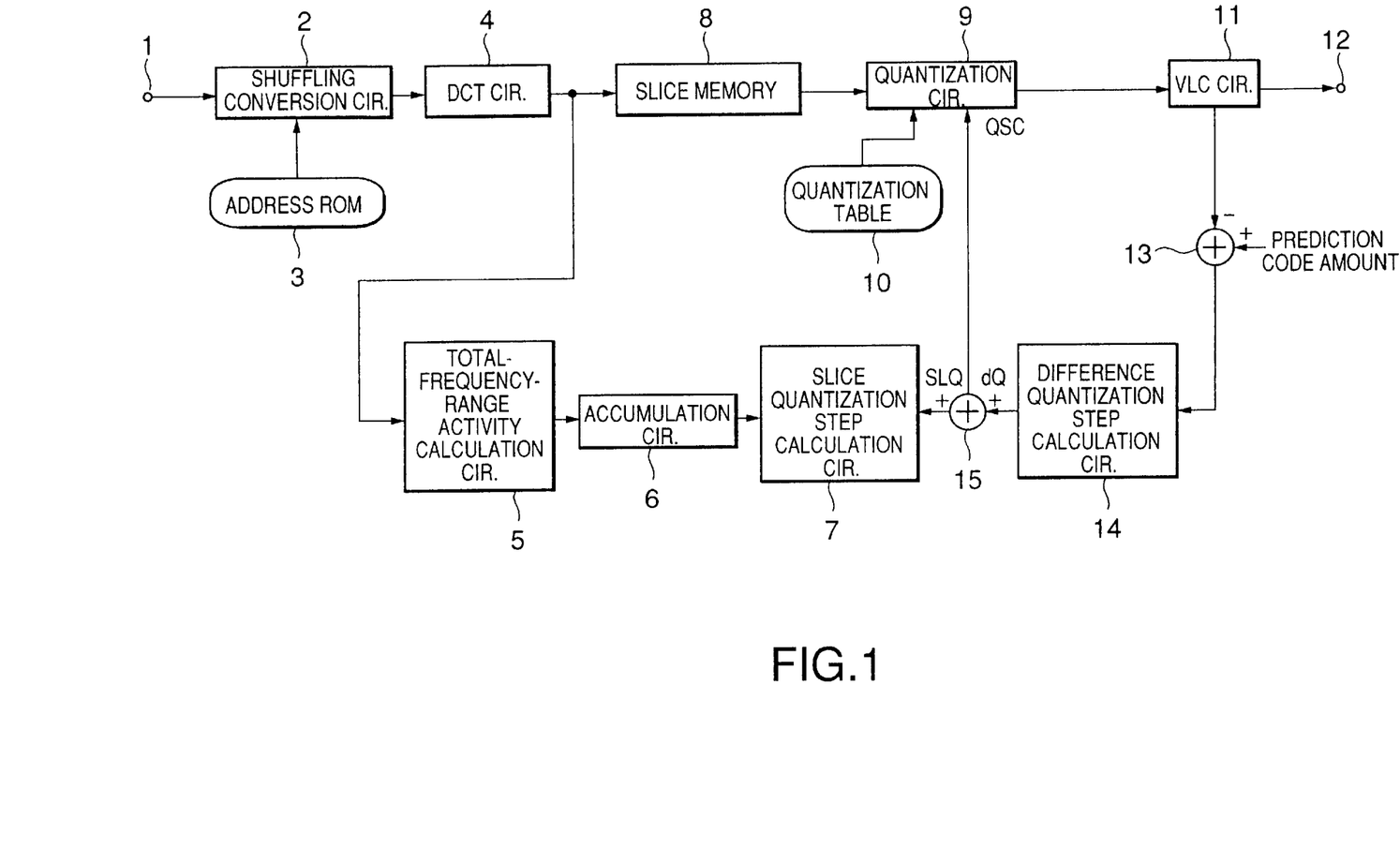
FIG. 1 is a block diagram of a picture coding apparatus according to a first embodiment of the present invention.

FIG. 1 is a block diagram showing the configuration of a first embodiment of the invention. Referring to FIG. 1, a digitized picture signal is input at an input terminal 1. Examples of the picture signal are a multi-valued black-and-white picture signal, RGB primary color signals, and a luminance signal and two kinds of color difference signals.

A shuffling circuit 2 blocks and shuffles a picture signal in the following manner. A picture signal of one frame as input to the shuffling circuit 2 is written into an internal memory (not shown) in the field order. Once one-frame picture signal is stored, it is read out on an 8-pixel/8-line block basis in accordance with shuffling addresses that are stored in an address ROM 3 and output to a DCT circuit 4. The shuffling addresses may be generated by a proper logic circuit rather than a ROM.

Figure 2A:
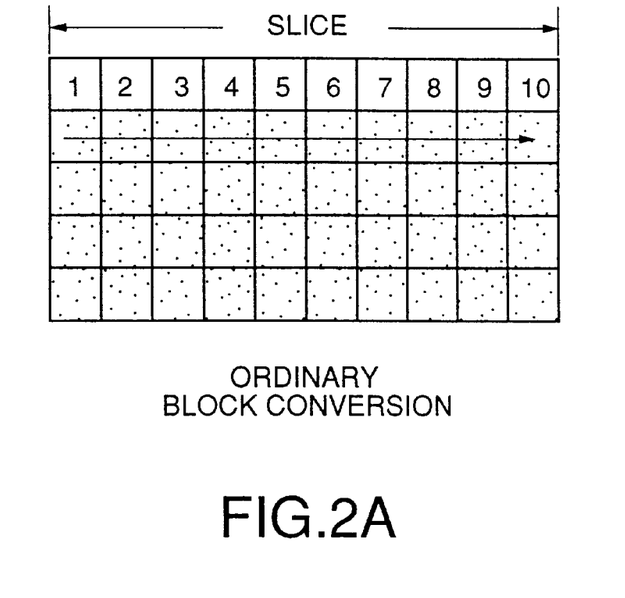
FIGS. 2A and 2B illustrate an example of shuffling conversion.
Figure 2B:
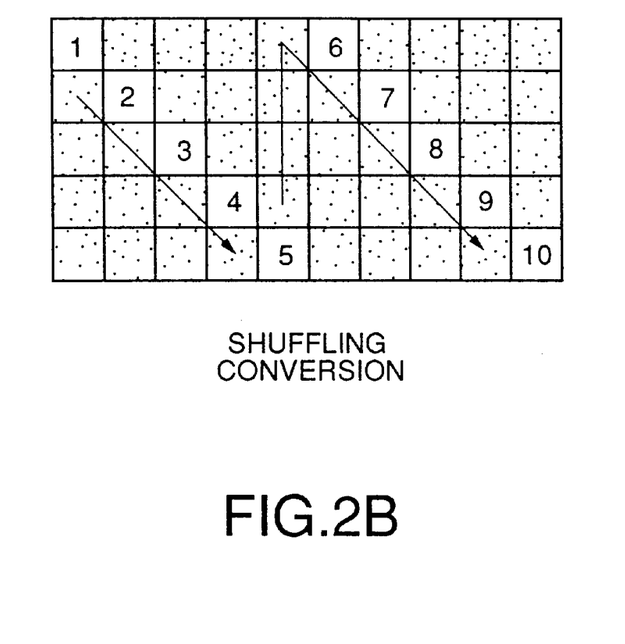

FIG. 2B shows an example of shuffling conversion according to this embodiment. Whereas in the conventional block conversion a coding operation is performed in the order of blocks that are consecutively arranged in the horizontal or vertical direction (see FIG. 2A), shuffling-converted blocks are read out in such an order that horizontally or vertically adjacent blocks are not read out consecutively (see FIG. 2B). Although FIG. 2B shows a case where one slice consists of 10 DCT blocks, the number of blocks constituting one slice is not limited to 10.

The DCT circuit 4 performs two-dimensional DCT (discrete cosine transform) on picture signal of a block basis. The DCT, which is a kind of orthogonal transform, is commonly used in picture coding apparatuses for compressing picture signals. Transforms other then the DCT may be used.

DCT coefficients obtained by the two-dimensional DCT in the DCT circuit 4 are output to a total-frequency-range activity calculation circuit 5 and a slice memory 8.

The total-frequency-range activity calculation circuit 5 calculates an activity per block of the DCT coefficients, and outputs it to an accumulation circuit 6. Examples of the activity index are the maximum of DCT coefficients, the sum of squares of DCT coefficients, and the sum of absolute values of DCT coefficients.

The accumulation circuit 6 accumulates an activity per slice, and outputs an accumulation value to a slice quantization step calculation circuit 7.

The slice quantization step calculation circuit 7 calculates a slice quantization step value SLQ that will be used as an average quantization step for intra-slice blocks based on the accumulated activity, and outputs a calculated value to an addition circuit 15.

An addition circuit 13 calculates a difference between a prediction code amount and a block-by-block output code amount which represents the buffering state of a VLC circuit 11, and outputs the difference to a difference quantization step calculation circuit 14.

The difference quantization step calculation circuit 14 determines a difference quantization step dQ by truncating LSB bits of an output of the addition circuit 13 (for instance, outputting only the highest 8 bits of a 12-bit-width arithmetic result), by using a ROM, or by some other method, and outputs the calculated difference quantization step dQ to the addition circuit 15.

The difference quantization step dQ becomes positive and decreases a generated code amount if the slice quantization step SLQ is smaller than an optimum value, and becomes negative and increases the generated code amount if the slice quantization step SLQ is larger than the optimum value. The addition circuit 15 adds up the slice quantization step SLQ and the difference quantization step dQ to determine a quantization step QSC to be used in a quantization circuit 9 as shown in Equation (1):

$$QSC = SLQ + dQ \qquad (1)$$

The slice memory 8 delays DCT coefficients while the quantization step QSC is calculated, and outputs delayed DCT coefficients to the quantization circuit 9.

The quantization circuit 9 quantizes the DCT coefficients as delayed by the slice memory 8 by using the quantization step QSC and a quantization table 10, and outputs quantized coefficients to the VLC circuit 11.

The VLC circuit 11 performs variable-length coding (entropy coding) on the quantized coefficients, and outputs as variable-length code words to an output terminal 12. The variable-length coding is a coding scheme in which shorter code words are allocated to data of high probabilities of occurrence and longer code words are allocated to data of low probabilities of occurrence, to thereby reduce the amount of generated codes of the data. Although the common way of effecting the variable-length coding is to combine the run-length coding and the Huffman coding, other coding schemes may be used.

The VLC circuit 11 accumulates in the frame the code amount of variable code words that are output from itself. The difference between the prediction code amount and the generated code amount is calculated and fed back to the quantization circuit 9.

The quantization step QSC is updated on a block-and-block basis in the above manner, and the coding operation can be performed with the generated code amount per frame kept within the target code amount.

Embodiment 2

Figure 3:
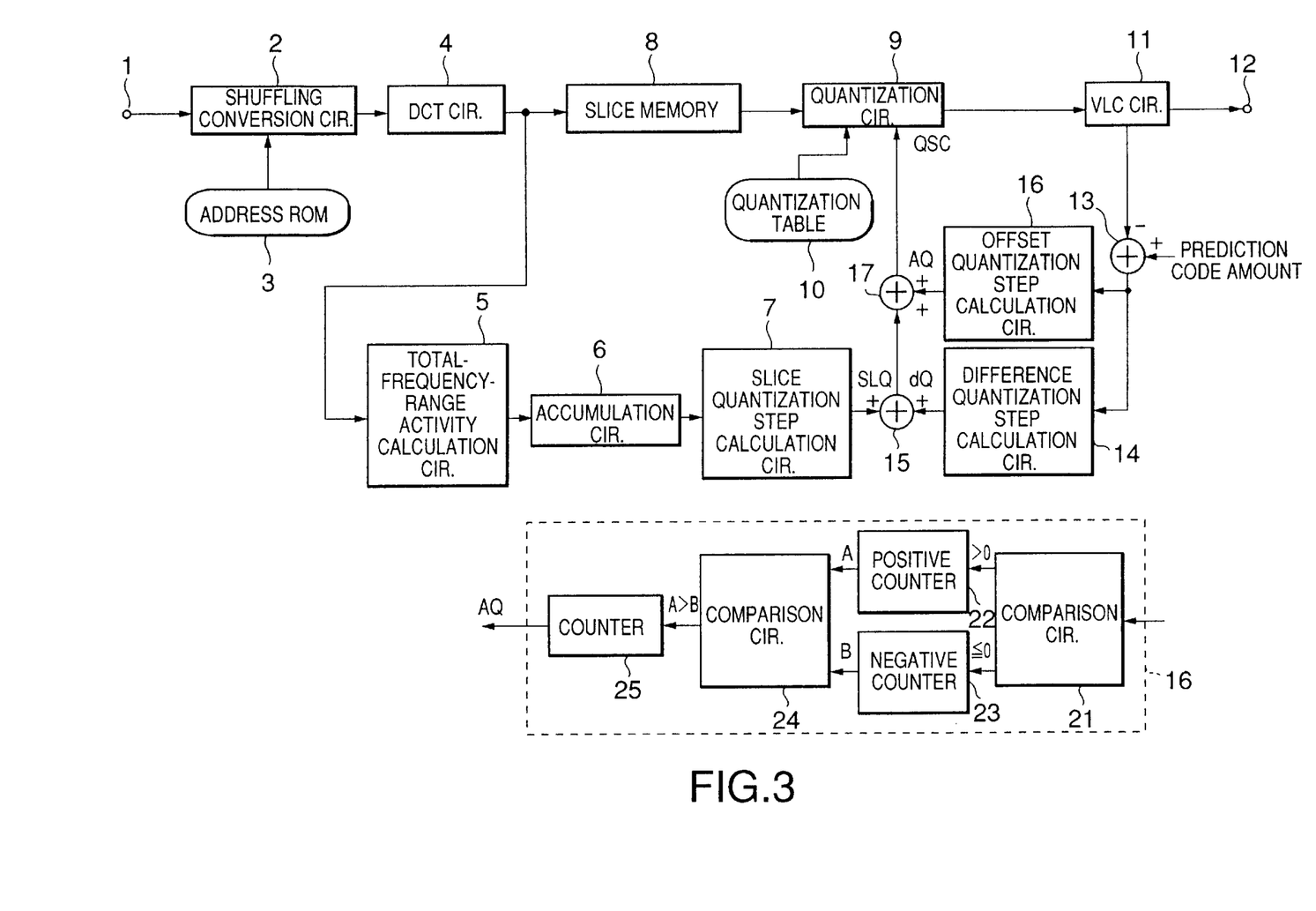
FIG. 3 is a block diagram of a picture coding apparatus according to a second embodiment of the invention.

FIG. 3 is a block diagram showing the configuration of a second embodiment of the invention. In this embodiment, as seen from FIG. 3, an offset quantization step calculation circuit 16 and an addition circuit 17 are added to the configuration of the first embodiment shown in FIG. 1. That is, the offset quantization step calculation circuit 16 and the addition circuit 17 are inserted between the output side of the addition circuit 13 and the output side of the addition circuit 15.

As shown in FIG. 3, the offset quantization step calculation circuit 16 consists of a comparison circuit 21 which receives an output of the addition circuit 13, a positive counter 22, a negative counter 23, a comparison circuit 24, and a counter 25. The comparison circuit 21 produces a control signal for driving the counter 22 when the difference, from i.e., the output value of the addition circuit 13 per block is positive, and produces a control signal for driving the counter 23 when the difference is negative or zero. The counters 22 and 23 are reset on a slice-by-slice basis, to analyze the code amount state of each slice. The comparison circuit 24 compares output values of the counters 22 with that of the counter 23 on a slice-by-slice basis. The comparison circuit 24 produces a control signal for driving the counter 25 when the output value of the counter 22 is larger than that of the counter 23. The counter 25, which is reset on a frame-by-frame basis, is driven by the control signal from the comparison circuit 24 when the number of over-prediction-code-amount blocks within the slice concerned is larger than that of under-prediction-code-amount blocks, and outputs as an offset quantization step AQ.

The addition circuit 15 adds up the slice quantization step SLQ and the difference quantization step dQ. The addition circuit 17 adds up an output value of the addition circuit 15 and the offset quantization step AQ, to determine the quantization step QSC to be used in the quantization circuit 9 as shown in Equation (2):

$$QSC = SLQ + dQ + AQ \qquad (2)$$

The quantization step QSC is updated on a block-and-block basis in the above manner, and the coding operation can be performed with the generated code amount kept within the frame target code amount and also kept within the block target code amount even in the midst of coding.

Embodiment 3

Figure 4:
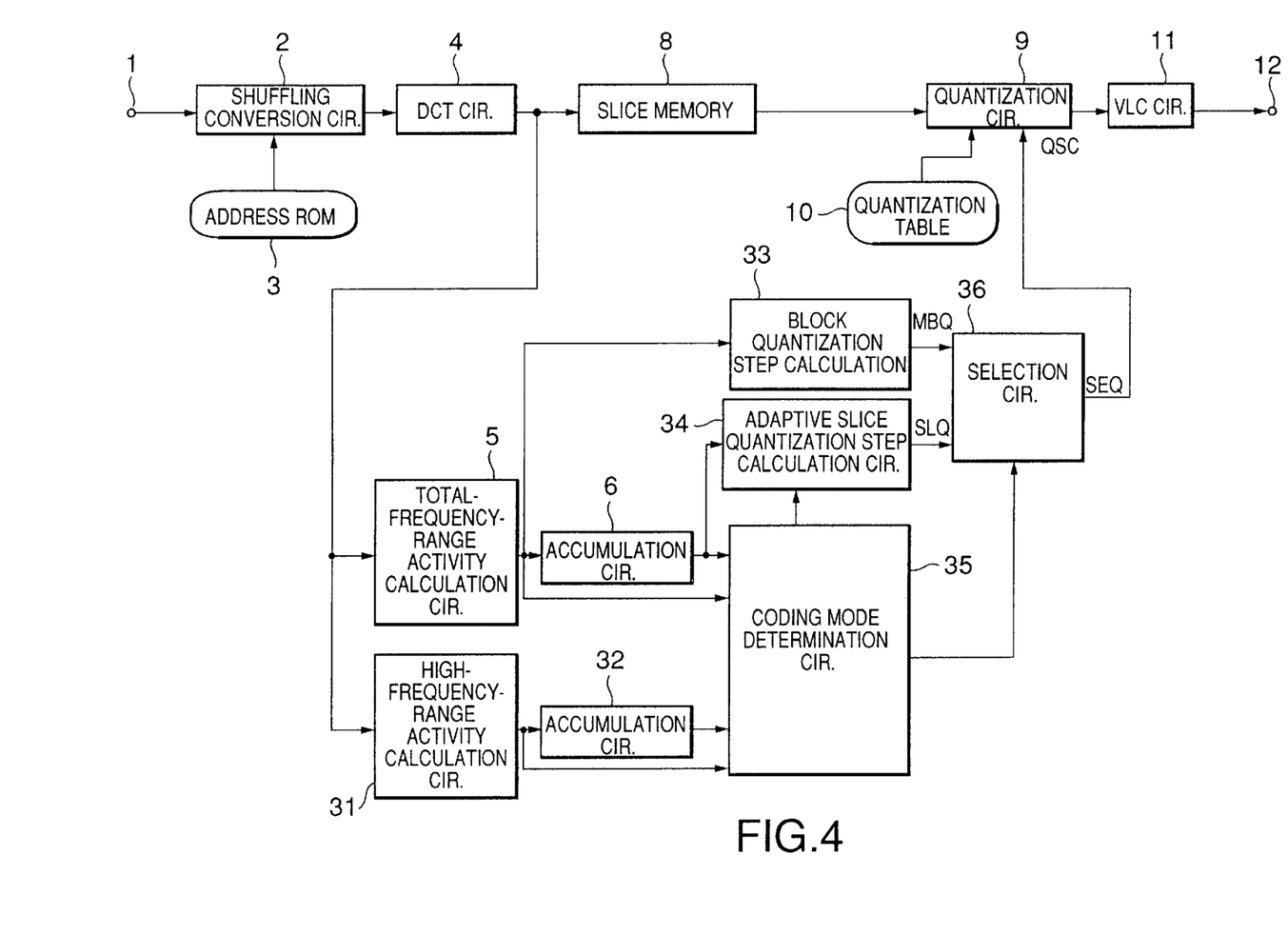
FIG. 4 is a block diagram of a picture coding apparatus according to a third embodiment of the invention.

FIG. 4 is a block diagram showing the configuration of a third embodiment of the invention. In this embodiment, as seen from FIG. 4, DCT coefficients as obtained by DCT by the DCT circuit 4 are output to a high-frequency-range activity calculation circuit 31 as well as to the total-frequency-range activity calculation circuit 5 and the slice memory 8.

The total-frequency-range activity calculation circuit 5 calculates an activity of 64 DCT coefficients of a block, and outputs the calculated activity to the accumulation circuit 6, a block quantization step calculation circuit 33, and a coding mode determination circuit 35.

The block quantization step calculation circuit 33 calculates a block quantization step MBQ from the total-frequency-range activity of the block, and outputs it to a selection circuit 36.

The accumulation circuit 6 accumulates the total-frequency-range activity of DCT coefficients over a slice, and outputs an accumulation value to an adaptive slice quantization step calculation circuit 34 and the coding mode determination circuit 35.

The high-frequency-range activity calculation circuit 31 calculates an activity of high-frequency DCT coefficients of a block, and outputs the calculated activity to an accumulation circuit 32 and the coding mode determination circuit 35.

Figure 5:
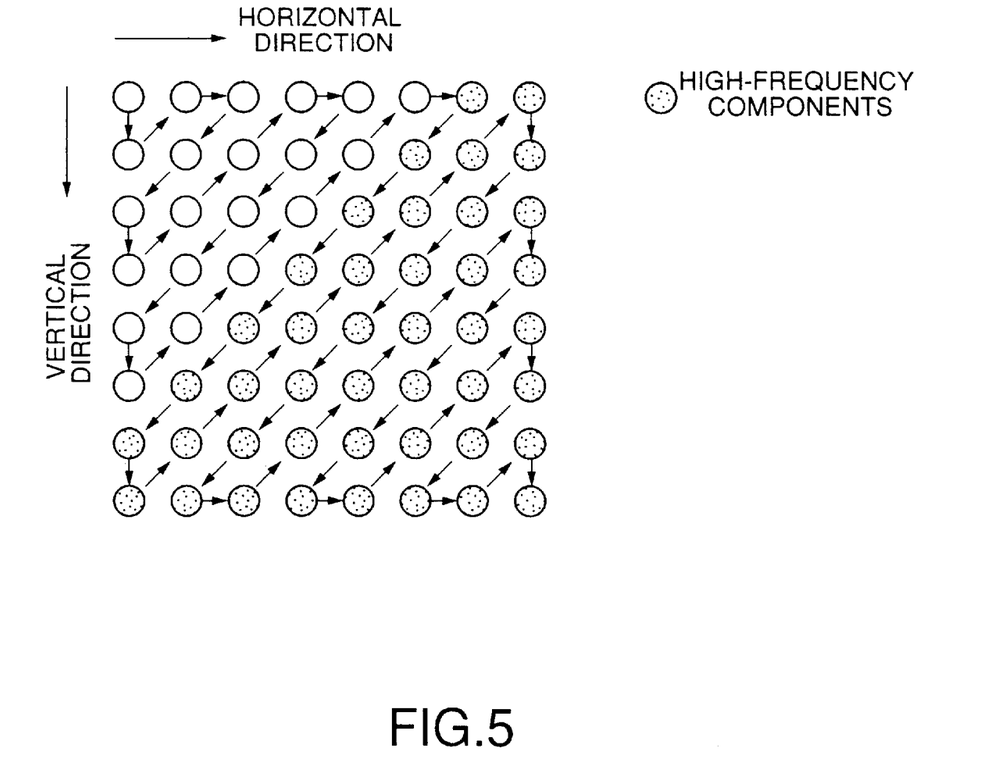
FIG. 5 shows an example of high-frequency components of DCT coefficients.

FIG. 5 shows an example of high-frequency DCT coefficients, in which 43 high-frequency DCT coefficients of zigzag-scan-converted data are used as high-frequency components. However, other scan conversion methods may used. The same effects can be obtained even if the number of high-frequency coefficients is not equal to 43. The accumulation circuit 32 accumulates the activity of high-frequency DCT coefficients over a slice, and outputs the accumulated activity to the adaptive slice quantization step calculation circuit 34 and the coding mode determination circuit 35.

To allow stable coding of pictures containing different features in one frame, the coding mode determination circuit 35 generates a selection signal for selecting a characteristic function that is to be used for calculation of a slice quantization step based on four kinds of activities, i.e., an accumulation value SLA of the per-slice total-frequency-range activity, an accumulation value SLH of the per-slice high-frequency-range activity, a per-block total-frequency-range activity BLA, and a per-block high-frequency activity BLH. The generated selection is supplied to the adaptive slice quantization step calculation circuit 34. Further, the coding mode determination circuit 35 outputs to the selection circuit 36 a control signal for selection between the block quantization step MBQ and the slice quantization step SLQ.

The adaptive slice quantization step calculation circuit 34 adaptively calculates the slice quantization step SLQ by using the total-frequency-range accumulation value of the accumulation circuit 6 and the characteristic function selection signal of the coding mode determination circuit 35, and outputs the calculated slice quantization step SLQ to the selection circuit 36.

The selection circuit 36 selects between the block quantization step MBQ and the slice quantization step SLQ in accordance with the selection control signal, and outputs the selected step as a quantization step QSC to be used in the quantization circuit 9.

A more detailed description will be made below of an example of calculation of the quantization step QSC.

When input pictures consist of frames each of which is uniform in feature, the picture quality of each frame can be kept constant by making the variation of the quantization step QSC small. However, the situation is different when input pictures consist of frames each which has different features, for instance, when each frame contains both of blocks having many edges as in the case of flower bed and plain blocks as in the case of a sky. A block having many edges needs to be compressed at a high compression ratio because of a large image information quantity, and hence the quantization step QSC is made large. On the other hand, if a plain block as in the case of a sky were quantized by using the same quantization step QSC as flower bed blocks, a large information quantity would be lost and deterioration in picture quality would be recognizable.

Figure 6:
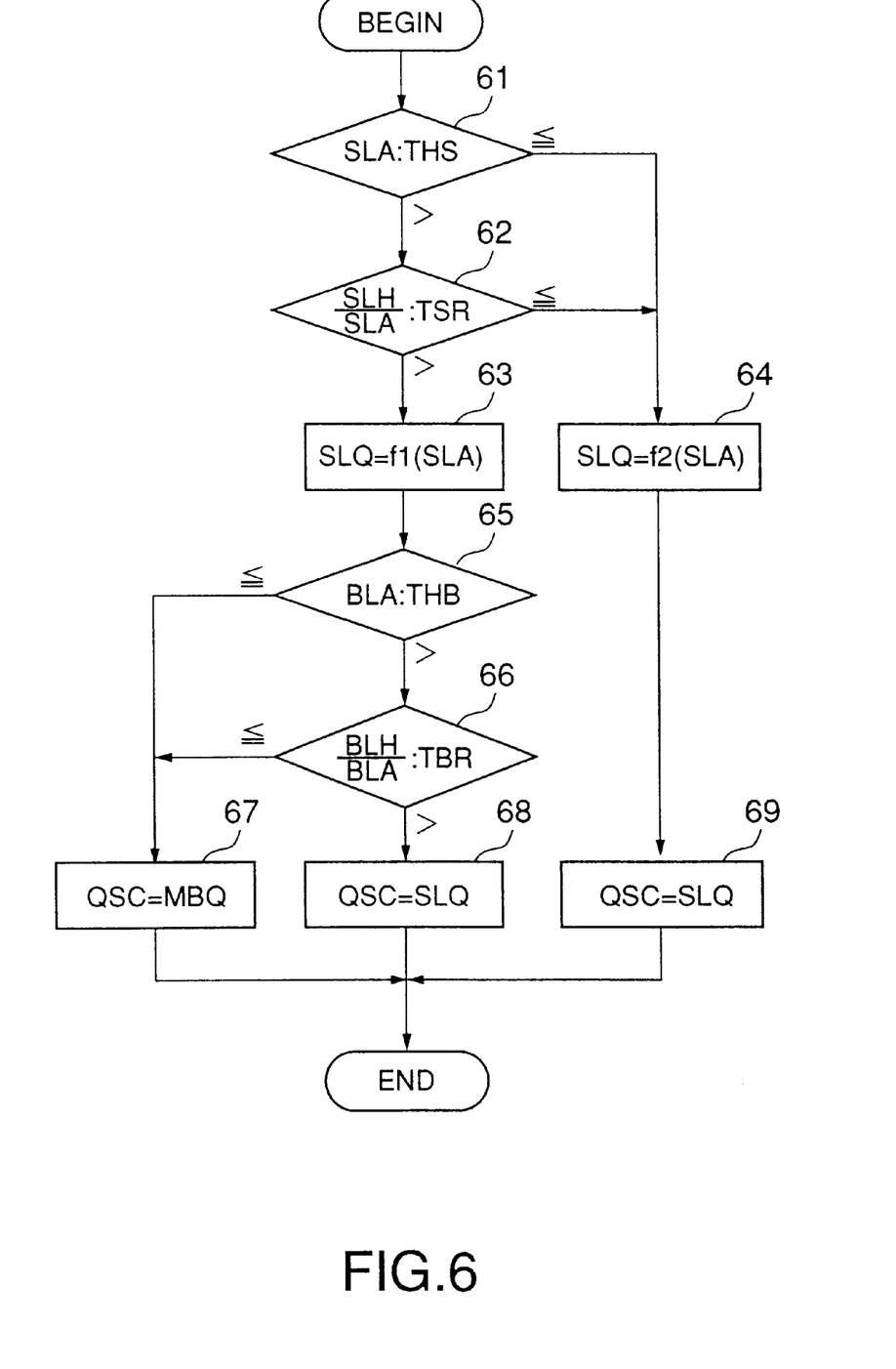
FIG. 6 is a flowchart showing a procedure of code amount control in the third embodiment of the invention.

To avoid the above problem, the code amount is controlled by using an algorithm shown in a flowchart of FIG. 6.

Figure 9:
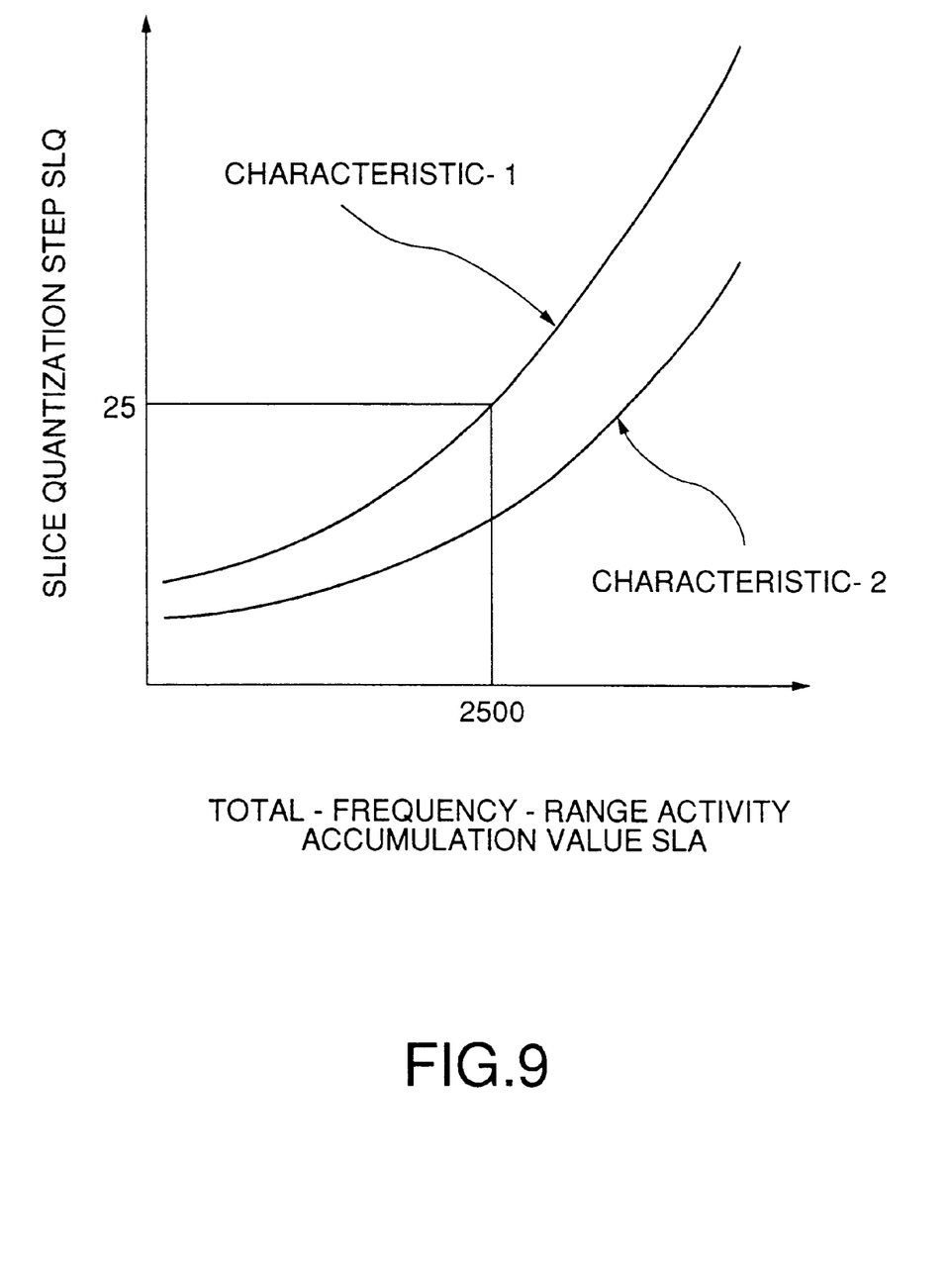
FIG. 9 is a graph showing an example of characteristic functions for calculating a slice quantization step.

FIG. 9 shows examples of characteristic functions in a case where the slice quantization step SLQ is calculated by using two kinds of characteristic functions.

First, the per-slice total-frequency-range activity accumulation value SLA is compared with a threshold THS (step 61 in FIG. 6). If SLA is larger than THS and if a ratio SLH/SLA of the per-slice high-frequency-range activity accumulation value SLH to the per-slice total-frequency-range activity accumulation value SLA is larger than a threshold TSR (step 62), the slice quantization step SLQ is calculated by using characteristic-1 of FIG. 9 (step 63) because the input picture should have a large information quantity and many high-frequency components. In the other cases, the slice quantization step SLQ is calculated by using characteristic-2 (step 64) with a judgment that the input picture should be an ordinary one. This is expressed by Equation (3):

[Equation 1]

$$SLQ = \begin{cases} f1(SLA); SLA > THS \text{ and } \frac{SLH}{SLA} > TSR \\ f2(SLA); \text{ in the other cases} \end{cases} \quad (3)$$

When the function of characteristic-1 is selected, the slice quantization step SLQ is selected (step 68) if the per-block total-frequency-range activity BLA is larger than a threshold THB (step 65) and a ratio BLH/BLA of the per-block high-frequency-range activity BLH to the per-block total-frequency-range activity BLA is larger than a threshold TBR (step 66). In the other cases, the block quantization step MBQ is selected (step 67). On the other hand, when the function of characteristic-2 is selected, the selection circuit 36 always selects the slice quantization step SLQ (step 69). This is expressed by Equation (4):

[Equation 2]

$$QSC = \begin{cases} SLQ; \text{ if characteristic-1 is selected, } BLA > THB, \\ \text{and } \frac{BLH}{BLA} > TBR, \text{ or if characteristic-2 is selected.} \\ MBQ; \text{ if characteristic-1 is selected, and if} \\ BLA \le THB \text{ or } \frac{BLH}{BLA} \le TBR. \end{cases} \quad (4)$$

As described above, even in the case of coding pictures in which each frame have different features, the coding operation can be performed with minimum deterioration in picture quality by selecting in an adaptive manner the quantization step QSC that is used for coding.

Embodiment 4

Figure 7:
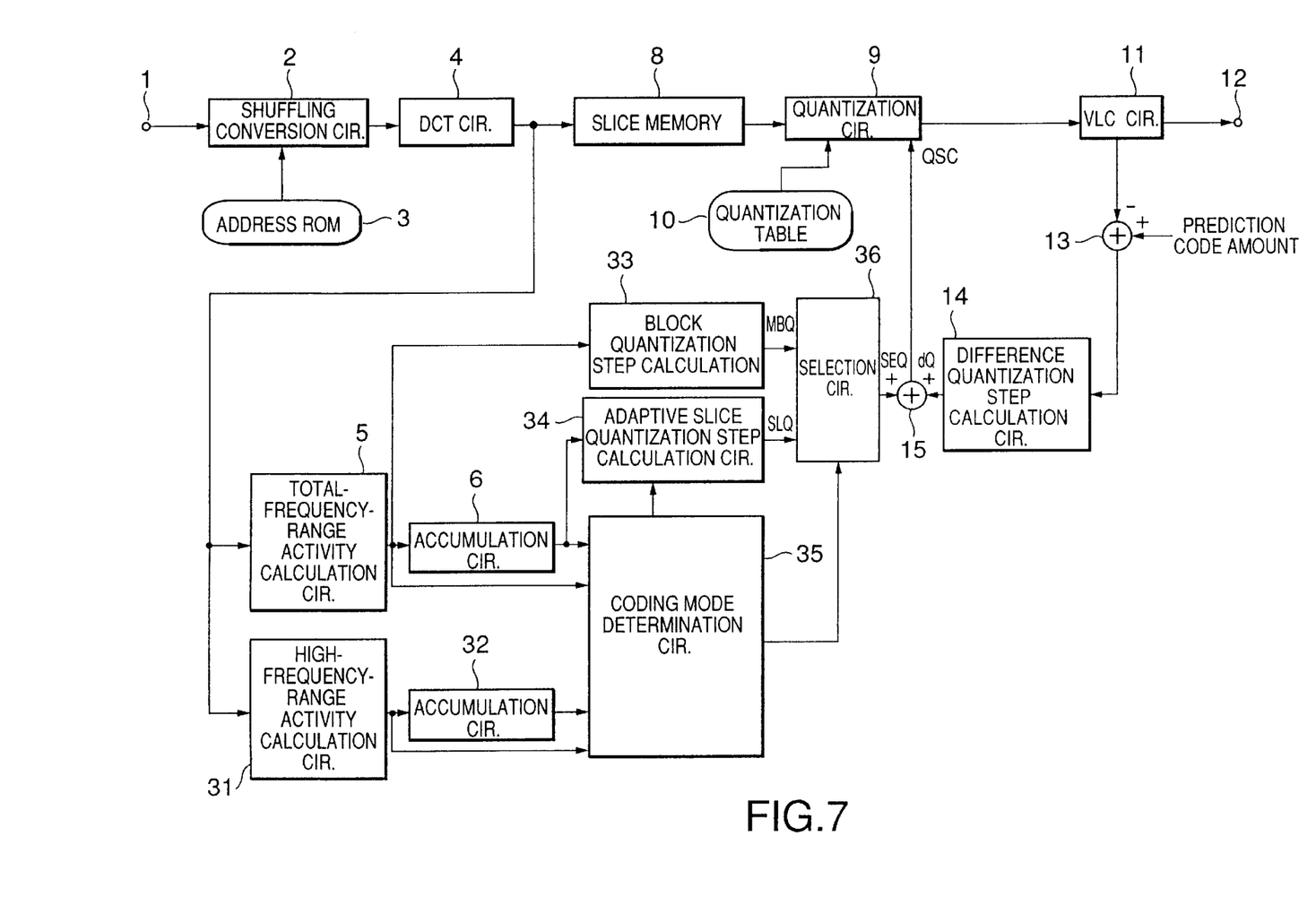
FIG. 7 is a block diagram of a picture coding apparatus according to a fourth embodiment of the invention.

FIG. 7 is a block diagram showing the configuration of a fourth embodiment of the invention. In this embodiment, as seen from FIG. 7, an addition circuit 13, a difference quantization step calculation circuit 14, and an addition circuit 15 are added to the third embodiment of FIG. 4.

The addition circuit 13 calculates a difference between a prediction code amount and a block-basis output code amount by utilizing the buffering state of the VLC circuit 11, and outputs the calculated difference to the difference quantization step calculation circuit 14.

The difference quantization step calculation circuit 14 calculates a difference quantization step dQ from the difference between the prediction code amount and the block-basis output code amount.

The addition circuit 15 adds up the difference quantization step dQ and a quantization step SEQ that is selected from the slice quantization step SLQ and the block quantization step MBQ, and outputs a quantization step QSC to be used in the quantization circuit 9 as shown in Equation (5):

$$QSC = SEQ + dQ \quad (5)$$

As described above, even in the case of coding pictures in which each frame have different features, the coding operation can be performed with minimum deterioration in picture quality and with the generated code amount per frame kept within the target code amount.

Embodiment 5

Figure 8:
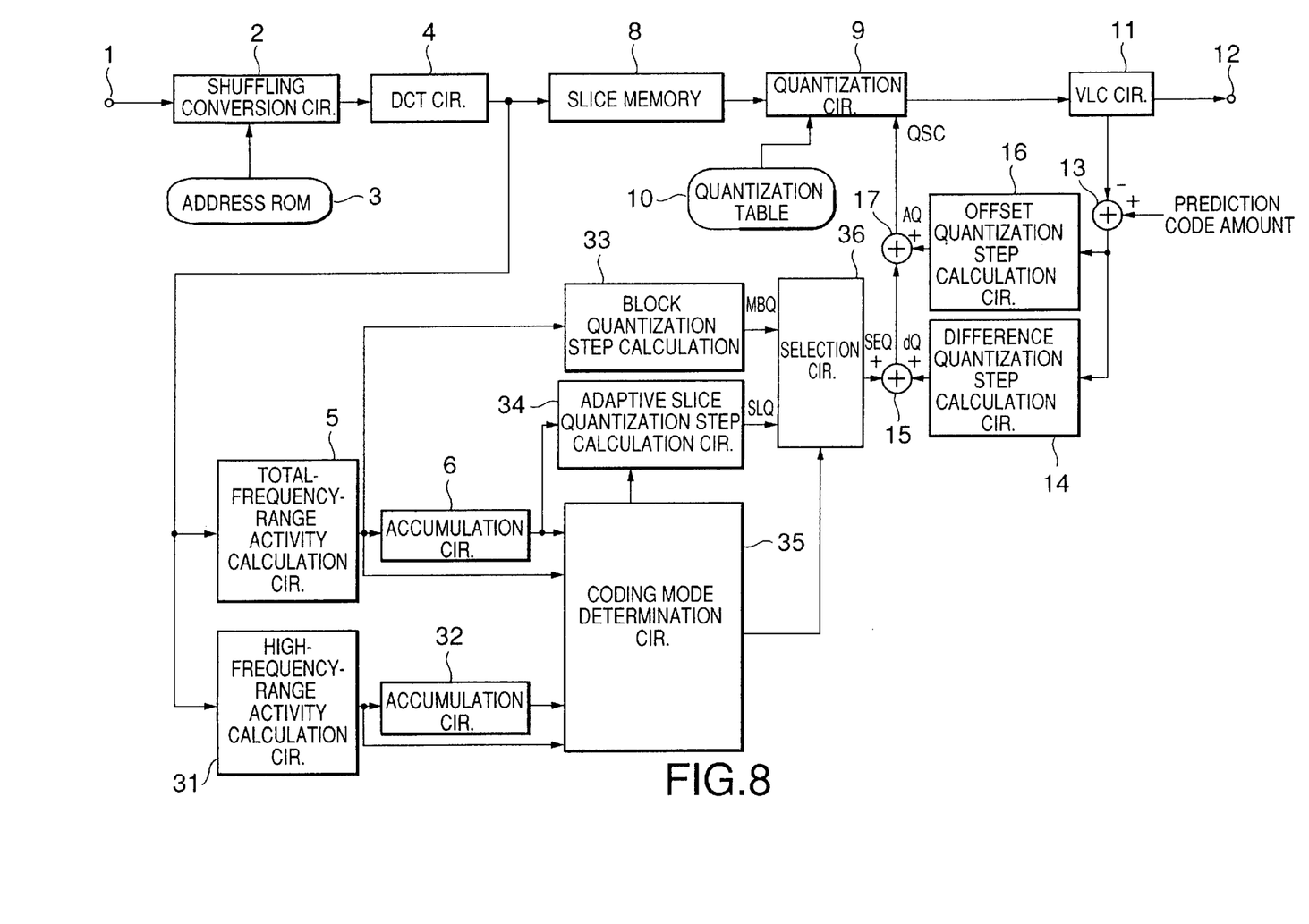
FIG. 8 is a block diagram of a picture coding apparatus according to a fifth embodiment of the invention.

FIG. 8 is a block diagram showing the configuration of a fifth embodiment of the invention. In this embodiment, as seen from FIG. 8, an offset quantization step calculation circuit 16 and an addition circuit 17 is added to the fourth embodiment of FIG. 7.

The addition circuit 17 adds up an output value of the addition circuit 15 and an offset quantization step AQ, and outputs a quantization step QSC to be used in the quantization circuit 9 as shown in Equation (6):

$$QSC=SEQ+dQ+AQ \tag{6}$$

A code amount control method suitable for use in this embodiment will be described below by using numerical values.

Figure 10:
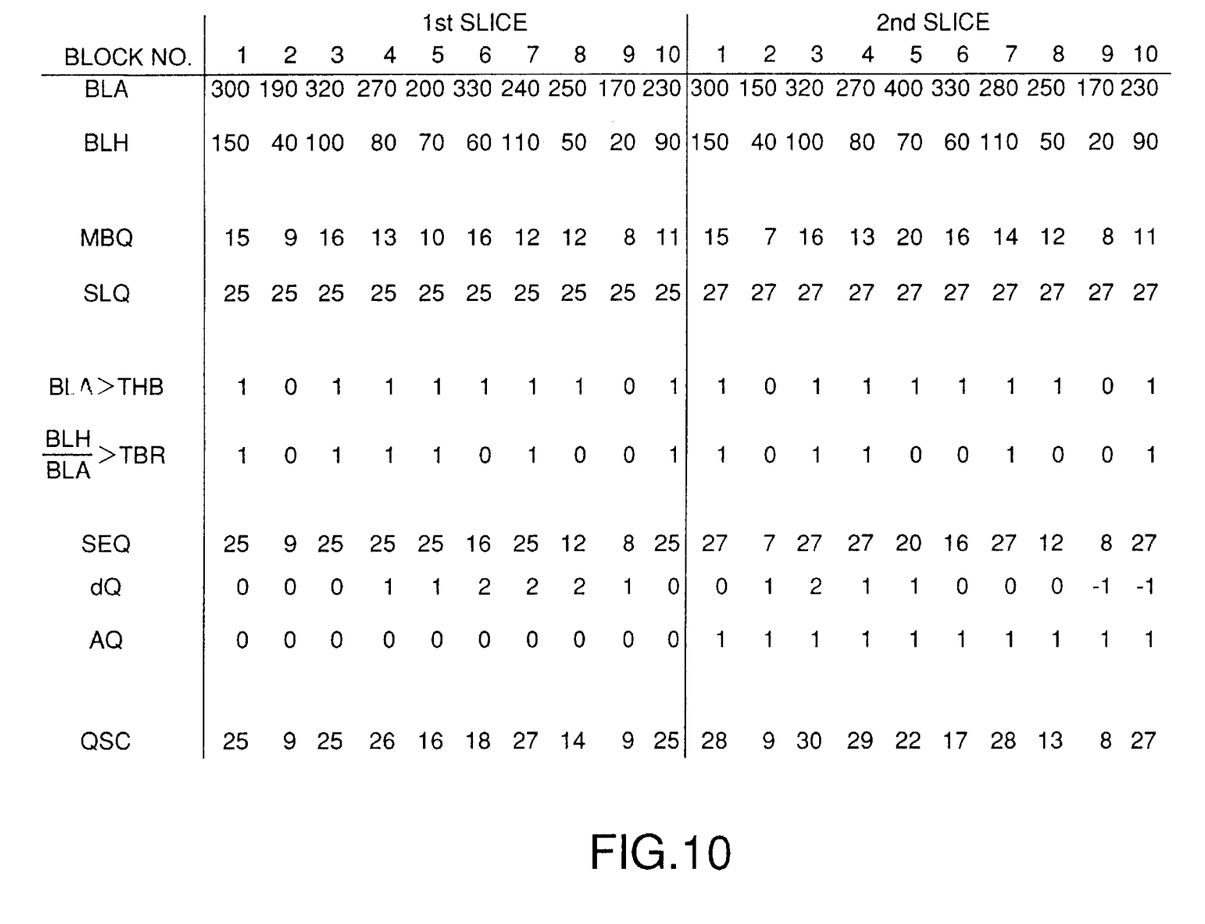
FIG. 10 is a table showing the operation of the picture coding apparatus according to the fifth embodiment.

FIG. 10 shows specific values of the per-block total-frequency-range activity BLA, the per-block high-frequency-range activity BLH, the block quantization step MBQ, the adaptive slice quantization step SLQ, the result of comparison between the activity BLA and the threshold THB, the result of comparison between the ratio BLH/BLA and the threshold TBR, the output SEQ of the selection circuit 36, the difference quantization step dQ, and the offset quantization step AQ, as well as values of the resulting quantization step SQC.

It is assumed that one frame of input pictures consists of 5 slices and one slice consists of 10 blocks. If the target code amount per frame is 5,000 bits, the target code amount per block is 100 bits.

The VLC circuit 11 and the counters 22, 23, and 25 are initialized at the start of each frame, and the difference quantization step dQ and the offset quantization step AQ is initialized to "0" at the start of a coding operation.

The thresholds THS, TSR, THB, and TBR are set as shown in Equations (7):

$$THS=2,000$$

$$TSR=0.25$$

$$THB=200$$

$$TBR=0.25 \tag{7}$$

In the first slice, the accumulation value SLA=2,500 is obtained from the BLA values of the respective blocks and the accumulation value SLH=770 is obtained from the BLH values of the respective blocks. In this case, SLQ=25 is obtained by using the characteristic-1 function of FIG. 9 because Inequalities (8) hold:

$$SLA=2,500>THS=2,000$$

$$SLH/SLA=0.31>TSR=0.25 \tag{(8)}$$

The block quantization step calculation circuit 33 calculates the block quantization step MBQ by using Equation (9):

$$MBQ=BLA/20 \tag{9}$$

As for the first block, the coding mode determination circuit 35 outputs a selection signal for selecting SLQ because Inequalities (10) hold, and hence the selection circuit 36 outputs SLQ=25.

$$BLA=300>THB=200$$

$$BLH/BLA=0.50>TBR=0.25 \tag{10}$$

Since both dQ and AQ are initialized, Equation (11) is obtained.

$$QSC=SLQ+dQ+AQ=25+0+0=25 \tag{11}$$

As for the second block, the coding mode determination circuit 35 outputs a selection signal for selecting MBQ because Inequalities (12) hold, and hence the selection circuit 36 outputs MBQ=9.

$$BLA=190<THB=200$$

$$BLH/BLA=0.21<TBR=0.25$$

Since dQ=0 from the buffering state of the VLC circuit 11 and AQ=0 from the output value of the offset quantization step calculation circuit 16, Equation (13) is obtained.

$$QSC=9+0+0=9 \tag{13}$$

As for the third block, QSC=25 is obtained by a calculation similar to the calculation for the first block.

As for the fourth block, the coding mode determination circuit 35 outputs a selection signal for selecting SLQ because Inequalities (14) hold, and hence the selection circuit 36 outputs SLQ=25.

$$BLA=270>THB=200$$

$$BLH/BLA=0.30>TBR=0.25 \tag{14}$$

Since dQ=1 is fed back because of the buffering state of the VLC circuit 11, Equation (15) is obtained.

$$QSC=SLQ+dQ+AQ=25+1+0=26 \tag{15}$$

The code amount control of the first slice is performed in the above manner.

In the second slice, SLQ=27 is obtained by using the characteristic-1 function in a manner similar to the manner of calculation in the first slice. In the first slice, since dQ>0 in 6 blocks and dQ<0 in 4 blocks, the counter 25 is driven to produce AQ=1.

As for the first block of the second slice, the coding mode determination circuit 35 outputs a selection signal for selecting SLQ because Inequalities (16) hold, and hence the selection circuit 36 outputs SLQ=27.

[Equation 3]

$$BLA=270>THB=200$$

$$BLH/BLA=0.30>TBR=0.25 \tag{16}$$

Since dQ=0 and AQ=1, Equation (17) is obtained.

$$QSC=SLQ+dQ+AQ=25+0+1=28 \tag{17}$$

The code amount control of one frame is performed on a block-by-block basis in a manner similar to the above.

As described above, even in the case of coding pictures in which each frame have different features, the coding operation can be performed with minimum deterioration in picture quality, and with the generated code amount kept within the frame target code amount and also kept within the block target code amount even in the midst of coding.

Although in this embodiment the quantization step QSC is updated on a DCT block basis, it is apparent that the same effects can be obtained even in a system where the quantization step QSC is updated with a plurality of blocks used as the unit of control.

As described above, the invention can provide a picture coding apparatus which can control the code amount so that it is kept within the target code amount on a real-time basis while maintaining high picture quality.

Specifically, according to the first embodiment, shuffling is performed at the same time as the block conversion, and the quantization step is calculated by using the accumulation circuit of the activity of DCT coefficients and the difference quantization step calculation circuit to which the buffering state of the VLC circuit is fed back. As a result, the quantization circuits and the variablelength coding amount accumulation circuits that are needed in the conventional moving picture coding apparatus can be eliminated, whereby the circuit scale of the apparatus as well as the coding delay can be reduced.

Further, the control is so made that the code amount is kept constant in each frame, that is, excessive codes are carried forward or from the next block and codes to fill up an insufficient block are carried backward from the next block. Since the code amount allocated to each frame is used efficiently, the reproduction picture quality can be improved.

According to the second embodiment, in addition to the advantage that the coding operation can be performed with the code amount kept within the frame target value by utilizing the buffering state of the VLC circuit, the code amount can be kept within the target value even in a block being coded.

According to the third embodiment in which the quantization step to be used for the quantization is selected adaptively in accordance with the characteristics of an input picture, not only can the number of large circuit scale analyzing circuits be reduced but also the degree of deterioration in picture quality of a picture having different features in one frame can be reduced. Thus, the reproduction picture quality can be improved.

According to the fourth embodiment, the quantization step to be used for the quantization is predicted adaptively from the activity of DCT coefficients and the buffering state of the VLC circuit is fed back. As a result, the reproduction picture quality of pictures having different features in one frame can be improved, and the coding operation can be performed with the generated code amount code amount per frame kept within the target code amount.

According to the fifth embodiment in which the quantization step to be used for the quantization is selected adaptively in accordance with the characteristics of an input picture and the buffering state of the VLC circuit, not only can the coding operation be performed with the code amount kept within the frame target value but also the code amount can be so controlled as to be kept within the target value even in a block being coded.

What is claimed is:

1. A picture coding apparatus comprising:

shuffling means for dividing an input digital picture signal into small-area blocks consisting of a plurality of pixels, and for shuffling the blocks within a frame;

orthogonal transform means for orthogonal-transforming the shuffled, block-basis digital picture signal, to produce transform coefficients;

quantizing means for quantizing the transform coefficients by using a quantization table and a quantization step;

variable-length coding means for converting the quantized coefficients into variable-length code words; and code amount control means for calculating a total-frequency-range activity and a high-frequency-range activity of each orthogonal transform block and a total-frequency-range activity accumulation value and a high-frequency-range activity accumulation value of a slice consisting of a plurality of blocks, selecting either of a slice quantization step which is calculated from the total-frequency-range activity accumulation value of the slice and a block quantization step which is calculated from the total-frequency-range activity of the block by using, as parameters for judgment, the total-frequency-range activity of the block and/or the high-frequency-range activity of the block, the total-frequency-range activity accumulation value of the slice and/or the high-frequency-range activity accumulation value of the slice, and a ratio between the total-frequency-range activity accumulation value of the slice and the high-frequency-range activity accumulation value of the slice, and determining the quantization step to be used in the quantizing means based on the selected quantization step;

wherein the code amount control means determines the quantization step to be used in the quantizing means by using a sum of the selected quantization step, and a difference quantization step which is calculated from a difference between a prediction code amount and an output code amount per block of the variable-length coding means, wherein:

the code amount control means compares the total-frequency-range activity accumulation value of the slice with a first predetermined threshold, calculates the slice quantization step by using a first characteristic as a characteristic function of defining a relationship between the total-frequency-range activity accumulation value and the slice quantization step with a judgment that the input picture signal represents a first picture having a large information quantity and many high-frequency components if the total-frequency-range activity accumulation value is larger than a second predetermined threshold and if a ratio between the high-frequency-range activity accumulation value and the total-frequency-range activity accumulation value is larger than a third predetermined threshold, and calculates the slice quantization step by using a second characteristic with a judgment that the input picture signal represents a second picture in the other cases; and wherein the code amount control means selects the slice quantization step when the first characteristic is selected, and if the total-frequency-range activity of the block is larger than a fourth predetermined threshold and if a ratio between the high-frequency-range activity of the block and the total-frequency-range activity is larger than a fifth predetermined threshold, and selects the block quantization step in the other cases, whereby the code amount control means adaptively determines the quantization step to be used in the quantizing means even in coding a picture having different features in the frame.

2. The picture coding apparatus according to claim 1, wherein the code amount control means always selects the slice quantization step when the second characteristic is selected.

3. A picture coding apparatus comprising:

shuffling means for driving an input digital picture signal into small-area blocks consisting of a plurality of pixels, and for shuffling the blocks within a frame;

orthogonal transform means for orthogonal-transforming the shuffled block-basis digital picture signal, to produce transform coefficients;

quantizing means for quantizing the transform coefficients by using a quantization table and a quantization step;

variable-length coding means for converting the quantized coefficients into variable-length code words; and code amount control means for determining the quantization step to be used in the quantizing means, wherein said code amount control means includes     first calculating means for calculating a total-frequency-range activity of each orthogonal transform block,     second calculating means for calculating a high-frequency-range activity of each orthogonal transform block,     third calculating means for calculating a total-frequency-range activity accumulation value of a slice consisting of a plurality of blocks,     fourth calculating means for calculating a block quantization step in accordance with said total-frequency-range activity,     fifth calculating means for calculating a slice quantization step in accordance with said total-frequency-range activity accumulation value, and     selecting means for selecting either of said block quantization step and said slice quantization step as said quantization step, in accordance with said total-frequency-range activity and said high-frequency-range activity.

4. A picture coding apparatus as claimed in claim 3, further comprising sixth calculating means for calculating a high-frequency-range activity accumulation value of the slice consisting of a plurality of blocks, wherein said selecting means includes a coding mode determining circuit for outputting a characteristic control signal to said fifth calculating means to control said slice quantization step in accordance with said total-frequency-range activity accumulation value and said high-frequency-range activity accumulation value.

\* \* \* \* \*